US012469448B2

(12) United States Patent
Ha et al.

(10) Patent No.: US 12,469,448 B2
(45) Date of Patent: Nov. 11, 2025

(54) DISPLAY DEVICE AND DRIVING METHOD OF THE SAME

(71) Applicant: LG Display Co., Ltd., Seoul (KR)

(72) Inventors: Chang Duk Ha, Paju-si (KR); Jae Young Kim, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 2 days.

(21) Appl. No.: 18/420,470

(22) Filed: Jan. 23, 2024

(65) Prior Publication Data

US 2024/0257738 A1 Aug. 1, 2024

(30) Foreign Application Priority Data

Jan. 27, 2023 (KR) ........................ 10-2023-0011008

(51) Int. Cl.
*G09G 3/3233* (2016.01)

(52) U.S. Cl.
CPC ... *G09G 3/3233* (2013.01); *G09G 2300/0426* (2013.01); *G09G 2300/0819* (2013.01); *G09G 2300/0852* (2013.01); *G09G 2310/08* (2013.01); *G09G 2320/0233* (2013.01); *G09G 2320/045* (2013.01)

(58) Field of Classification Search
None
See application file for complete search history.

(56) References Cited

U.S. PATENT DOCUMENTS

2012/0050274 A1* 3/2012 Yoo ........................ G09G 3/003 345/212
2018/0144705 A1* 5/2018 Lee ...................... G09G 3/3225
2019/0156747 A1 5/2019 Nie et al.
2021/0318773 A1* 10/2021 Kim ..................... G09G 3/3233
2023/0197000 A1* 6/2023 Jo ........................ G09G 3/2007 345/690

FOREIGN PATENT DOCUMENTS

KR 20200067584 A 6/2020
KR 20220089325 A 6/2022

* cited by examiner

*Primary Examiner* — Ifedayo B Iluyomade
(74) *Attorney, Agent, or Firm* — Seed Intellectual Property Law Group LLP

(57) ABSTRACT

Provided is a display device. The display device includes a display panel including a subpixel, The subpixel includes a compensation circuit configured to compensate for a driving current generated from a driving transistor based on a compensation voltage input from outside of the sub-pixel.

20 Claims, 15 Drawing Sheets

DISPLAY DEVICE AND DRIVING METHOD OF THE SAME

CROSS-REFERENCE TO RELATED APPLICATION(S)

This application claims the benefit of Korean Patent Application No. 10-2023-0011008, filed on Jan. 27, 2023, which is hereby incorporated by reference as if fully set forth herein.

BACKGROUND

Technical Field

The present disclosure relates to a display device and a method of driving the same.

Description of the Related Art

With the development of information technology, the market for display devices that are media for connection between users and information has been growing. Accordingly, display devices such as a light-emitting display (LED) device, a quantum dot display (QDD), and a liquid crystal display (LCD) have been increasingly used.

The above-described display devices each include a display panel including subpixels, a driver configured to output a driving signal for driving of the display panel, and a power supply configured to generate power to be supplied to the display panel or the driver.

In such a display device, when subpixels formed in a display panel are supplied with driving signals, for example, a scan signal and a data signal, a selected one thereof may transmit light therethrough or may directly emit light, thereby being able to display an image.

BRIEF SUMMARY

Accordingly, the present disclosure is directed to a display device and a method of driving the same that substantially obviate one or more problems due to limitations and disadvantages of the related art.

This embodiment compensates for driving current deviation due to a difference in characteristics of a driving transistor after threshold voltage compensation, thereby minimizing a possibility of occurrence of display defects such as low-gradation unevenness and uniformizing display quality.

Additional advantages, objects, and features of the disclosure will be set forth in part in the description which follows and in part will become apparent to those having ordinary skill in the art upon examination of the following or may be learned from practice of the disclosure. The objectives and other advantages of the disclosure may be realized and attained by the structure particularly pointed out in the written description and claims hereof as well as the appended drawings.

To achieve these technical benefits and other advantages, as embodied and broadly described herein, a display device includes a subpixel, and a data driver configured to supply a data voltage to the subpixel, wherein the subpixel includes a compensation circuit configured to compensate for a driving current generated from a driving transistor based on a compensation voltage input from outside of the sub-pixel.

In another aspect of the present disclosure, there is provided a method of driving a display device including a display panel including a plurality of subpixels, and a data driver configured to supply a data voltage to the plurality of subpixels. The method includes compensating for a threshold voltage of a driving transistor included in each of the plurality of subpixels, applying a compensation voltage to the plurality of subpixels to compensate for driving current deviation between the plurality of subpixels, and causing the plurality of subpixels to emit light.

It is to be understood that both the foregoing general description and the following detailed description of the present disclosure are exemplary and explanatory and are intended to provide further explanation of the disclosure as claimed.

BRIEF DESCRIPTION OF THE SEVERAL VIEWS OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings.

DETAILED DESCRIPTION

Reference will now be made in detail to the preferred embodiments of the present disclosure, examples of which are illustrated in the accompanying drawings. Wherever possible, the same reference numbers will be used throughout the drawings to refer to the same or like parts.

A display device according to the present disclosure may be implemented as an LED device, a QDD, etc. However, hereinafter, for convenience of description, an LED device that directly emits light based on an inorganic light-emitting diode or an organic light-emitting diode will be taken as an example.

In addition, a thin film transistor (TFT) described below may be implemented as an n-type TFT, as a p-type TFT, or in a form in which n-type and p-type are present together. The TFT is a three-electrode element including a gate, a source, and a drain. The source is an electrode that supplies a carrier to a transistor. In the TFT, a carrier starts flowing from the source. The drain is an electrode through which a carrier exits the TFT. That is, in the TFT, a carrier flows from the source to the drain.

In the case of the p-type TFT, since the carrier is a hole, a source voltage is higher than a drain voltage so that the hole may flow from the source to the drain. In the p-type TFT, a hole flows from the source to the drain side, and thus current flows from the source to the drain side. In contrast, in the case of the n-type TFT, since an electron is a carrier, the source voltage is lower than the drain voltage so that an electron may flow from the source to the drain. In the n-type TFT, an electron flows from the source to the drain side, and thus current flows from the drain to the source side. However, the source and the drain of the TFT may be changed depending on the applied voltage. Reflecting this, in the following description, one of the source and drain will be described as a first electrode, and the other of the source and drain will be described as a second electrode.

Figure 1:
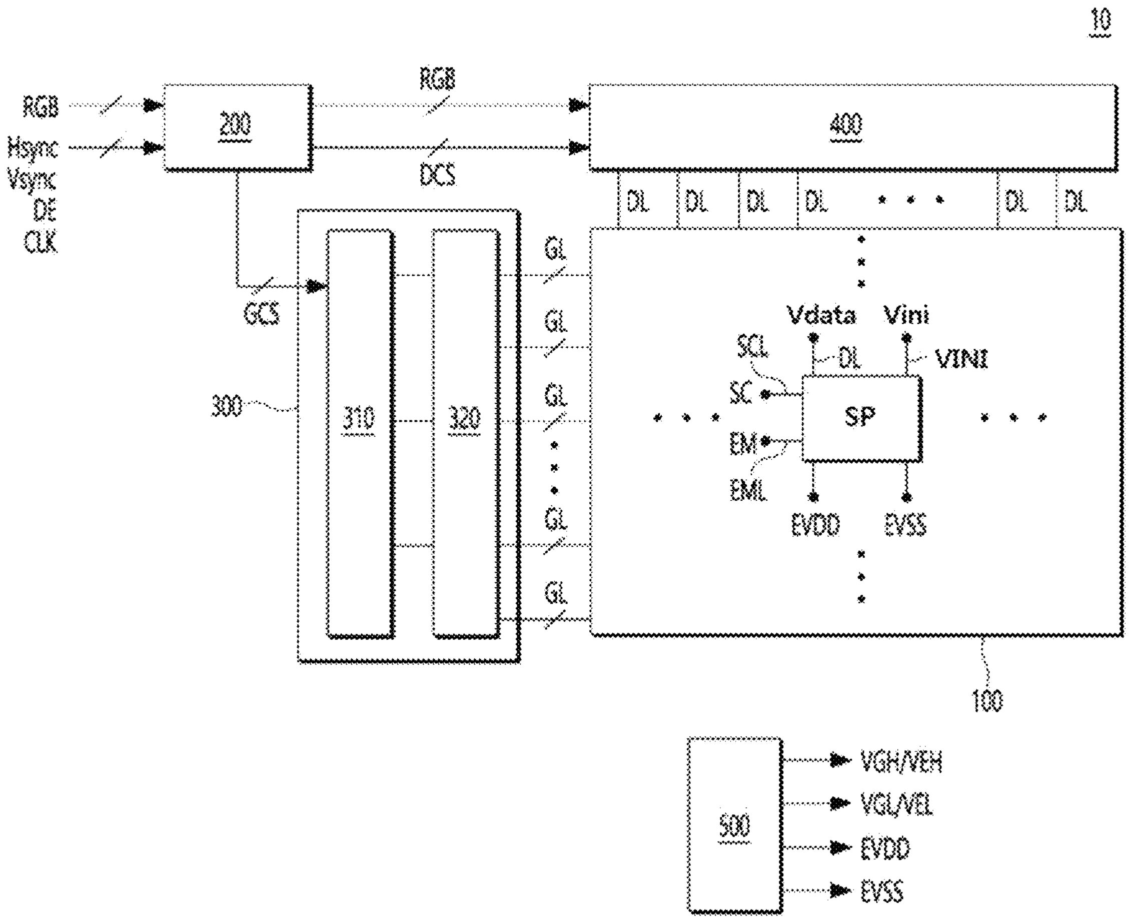
FIG. 1 is a block diagram schematically illustrating a display device according to an embodiment of the present disclosure.

FIG. 1 is a block diagram schematically illustrating a display device according to an embodiment of the present disclosure.

As shown in FIG. 1, a display device 10 may include a display panel 100 including a plurality of subpixels SP, a controller 200, a gate driver 300 configured to supply a gate signal to each of the plurality of subpixels SP, a data driver 400 configured to supply a data signal (or data voltage) to each of the plurality of subpixels SP, a power supply 500 configured to supply power to each of the plurality of subpixels SP, etc.

The display panel 100 may include a display area (see AA of FIG. 2) in which the plurality of subpixels SP is located and a non-display area (see NA of FIG. 2) which is disposed to be adjacent to the display area AA, or partially or fully surround the display area AA. As an example, the gate driver 300 and/or the data driver 400 may be disposed in the non-display area, for example, in a gate in panel (GIP) type, or be connected to the non-display area, for example, in a chip on glass (COG) type, a chip on panel (COP) type, or a chip on film (COF) type.

In the display panel 100, a plurality of gate lines GL and a plurality of data lines DL intersect each other, and each of the plurality of subpixels SP may be connected to a gate line GL and a data line DL. Specifically, one subpixel SP may receive supply of a gate signal from the gate driver 300 through the gate line GL, receive supply of a data signal from the data driver 400 through the data line DL, and receive supply of a high-potential voltage EVDD and a low-potential voltage EVSS from the power supply 500.

The gate lines GL may transmit scan signals SC and light emission control signals EM to the plurality of subpixels SP, and the data lines DL may transmit data voltages Vdata to the plurality of subpixels SP. According to various embodiments, the gate line GLs may include a plurality of scan lines SCL for supply of scan signals SC and a plurality of light emission control lines EML for supply of light emission control signals EM. The plurality of subpixels SP may receive supply of initialization voltages Vini from initialization lines VINI. Embodiments are not limited thereto. As an example, at least one of the above-mentioned lines or signals could be omitted, and/or at least one additional line could be further included.

Each of the plurality of subpixels SP may include a pixel circuit. The pixel circuit may include a plurality of switching elements, driving elements, capacitors, etc. Each of the switching elements and the driving elements may be made of a TFT. A switching transistor may be switched according to a scan signal SC supplied through a scan line SCL and a light emission control signal EM supplied through a light emission control line EML. A driving transistor may control the amount of light emission by controlling the amount of current supplied to a light-emitting device OLED according to a data voltage Vdata.

The display panel 100 may be implemented as a non-transmissive display panel or a transmissive display panel. The transmissive display panel may be applied to a transparent display device where an image is displayed on a screen and an actual object in a background is visible. The display panel 100 may be implemented as a flexible display panel. A plastic board may be used as the flexible display panel. The plurality of subpixels SP may each be divided into a red pixel, a green pixel, and a blue pixel for color implementation. The plurality of subpixels SP may each further include a white pixel. Embodiments are not limited thereto. Pixels of other colors such as cyan, magenta and yellow are also possible.

Touch sensors may be disposed on the display panel 100. Touch input may be sensed using separate touch sensors or sensed through the plurality of subpixels SP. The touch sensors may be disposed on the screen of the display panel as on-cell type or add-on type touch sensors, or may be implemented as in-cell type touch sensors incorporated in the display panel 100. The touch sensors may be omitted depending on the design.

The controller 200 may process image data RGB input from the outside in accordance with the size and resolution of the display panel 100 and supply the image data to the data driver 400. The controller 200 may use synchronization signals input from outside of itself, for example, a dot clock signal CLK, a data enable signal DE, a horizontal synchronization signal Hsync, and a vertical synchronization signal Vsync to generate a gate control signal GCS and a data control signal DCS. The controller 200 may control operation timing of the gate driver 300 by supplying the gate control signal GCS to the gate driver 300. The controller 200 may control operation timing of the data driver 400 by supplying the data control signal DCS to the data driver 400. The controller 200 may synchronize operation timing of the gate driver 300 with operation timing of the data driver 400 using the gate control signal GCS and the data control signal DCS.

The controller 200 may be configured by being combined with various processors, for example, a microprocessor, a mobile processor, an application processor, etc., depending on the mounted device. A host system separated from (e.g., located in front of) the controller 200 may be any one of a television (TV) system, a set-top box, a navigation system, a personal computer (PC), a home theater system, a mobile device, a wearable device, a vehicle system, a household appliance, an infrastructure or a building, without being limited thereto.

The controller 200 may control operation timing of a display panel driver at a frame frequency of input frame frequency×i (i being a positive integer greater than 0) Hz by multiplying an input frame frequency by i. The input frame frequency may be 60 Hz in the NTSC (National Television Standards Committee) method, and may be 50 Hz in the PAL (Phase-Alternating Line) method. Embodiments are not limited thereto. As an example, the input frame frequency may be a frequency other than 50 Hz and 60 Hz, such as 10 Hz, 120 Hz, etc.

The controller 200 may drive the display panel 100 at various refresh rates. The controller 200 may drive the display panel 100 in a variable refresh rate (VRR) mode, that is, in a switchable form between a first refresh rate and a second refresh rate. For example, the controller 200 may drive the display panel 100 at various refresh rates by simply changing a speed of a clock signal, generating a synchronization signal to create a horizontal blank or vertical blank, or driving the gate driver 300 using a mask method, without being limited thereto.

A voltage level of the gate control signal GCS output from the controller 200 may be converted into gate-on voltages (VGL, VEL) and gate-off voltages (VGH, VEH) through a level shifter (not shown) and supplied to the gate driver 300. The level shifter may convert a low-level voltage of the gate control signal GCS into a gate low (on) voltage VGL, and convert a high-level voltage of the gate control signal GCS into a gate high (off) voltage VGH. The gate control signal GCS may include a start pulse and a shift clock.

The gate driver 300 may supply a gate signal to the gate line GL according to the gate control signal GCS supplied from the controller 200. The gate driver 300 may be disposed on one or both sides of the display panel 100 using a gate-in-panel (GIP) method.

The gate driver 300 may sequentially output gate signals to the plurality of gate lines GL under the control of the controller 200. The gate driver 300 may sequentially supply the signals to the gate lines GL by shifting the gate signals using a shift register.

The gate signal may include the scan signal SC and the light emission control signal EM in an organic light emitting display device. The scan signal SC may include a scan pulse that swings between the gate-on voltage VGL and the gate-off voltage VGH. The light emission control signal EM may include a light emission control signal pulse that swings between the gate-on voltage VEL and the gate-off voltage VEH. The scan pulse may select subpixels SP of a line on which the data voltage Vdata is to be written. The light emission control signal EM may define light emission times of the subpixels SP.

The gate driver 300 may include a light emission control signal driver 310 and at least one scan driver 320. The light emission control signal driver 310 may output light emission control signal pulses in response to the start pulse and the shift clock from the controller 200, and sequentially shift the light emission control signal pulses according to the shift clock. At least one scan driver 320 may output a scan pulse in response to the start pulse and the shift clock from the controller 200 and shift the scan pulse in accordance with shift clock timing. As an example, in the case where the light emission control signal is omitted, the light emission control signal driver 310 could be omitted correspondingly.

The data driver 400 may convert the image data RGB into the data voltage Vdata according to the data control signal DCS supplied from the controller 200 and output the image data RGB through the data line DL.

FIG. 1 illustrates that one data driver 400 is disposed on one side of the display panel 100. However, the number and arrangement positions of data drivers 400 are not limited thereto. As an example, the data driver 400 may include a plurality of integrated circuits (IC) and may be arranged separately on one side As an example, or more than one side of the display panel 100.

The power supply 500 may use a DC-DC converter to generate direct current (DC) power necessary to drive the pixel array of the display panel 100 and the display panel driver. The DC-DC converter may include a charge pump, a regulator, a buck converter, a boost converter, etc. The power supply 500 may receive input of a direct current input voltage from the host system (not shown) or another device other than the host system, and generate DC voltages such as the gate-on voltages (VGL, VEL), the gate-off voltages (VGH, VEH), the high-potential voltage EVDD, and/or the low-potential voltage EVSS. The gate-on voltages (VGL, VEL) and the gate-off voltages (VGH, VEH) may be supplied to the level shifter (not shown) and the gate driver 300. As an example, the high-potential voltage EVDD and the low-potential voltage EVSS may be commonly supplied to the plurality of subpixels SP, without being limited thereto. As an example, the high-potential voltage EVDD and the low-potential voltage EVSS may be individually supplied to at least some of the plurality of subpixels SP.

Figure 2:
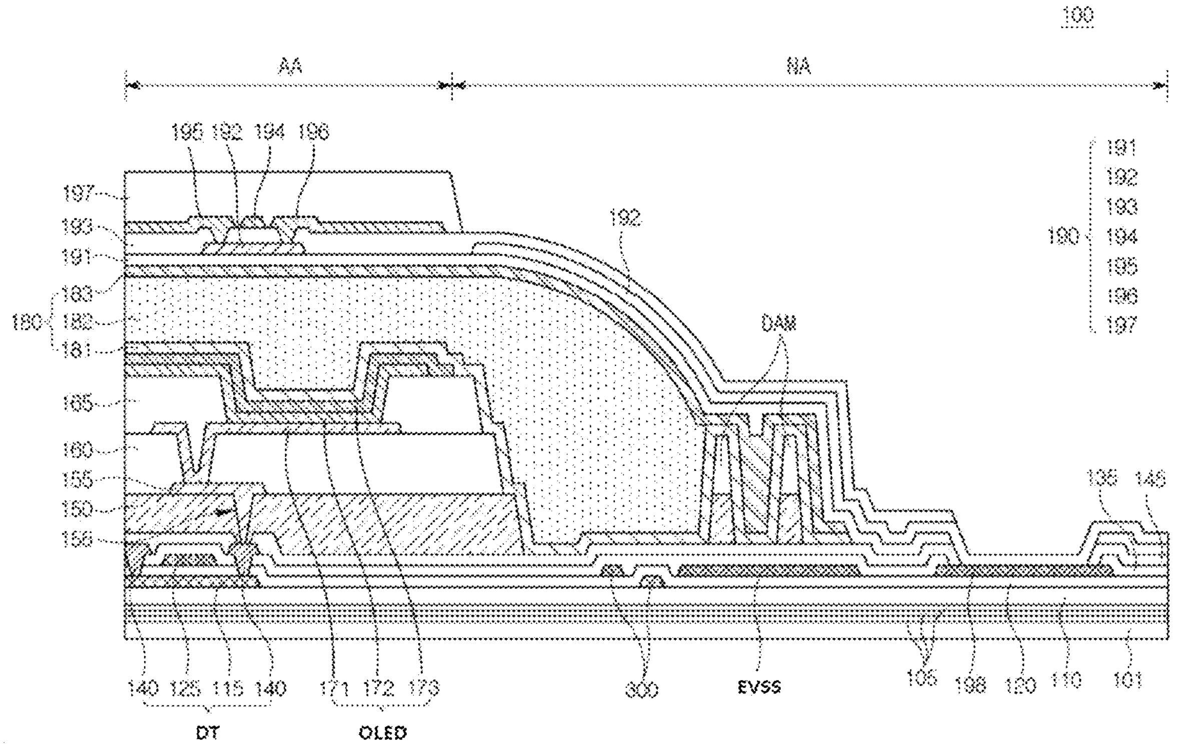
FIG. 2 is a cross-sectional view illustrating a stacked form of a display panel according to an embodiment of the present disclosure.

FIG. 2 is a cross-sectional view illustrating a stacked form of a display panel according to an embodiment of the present disclosure.

As shown in FIG. 2, a driving transistor DT for driving the light-emitting device OLED disposed in the display area AA may be disposed on a substrate 101 of the display panel 100. The driving transistor DT may include a semiconductor layer 115, a gate electrode 125, and source and drain electrodes 140. For convenience of description, only the driving transistor DT is shown among various TFTs that may be included in the pixel circuit. However, other TFTs such as switching transistors may be included in the pixel circuit. In addition, in the present disclosure, the driving transistor DT is described as having a coplanar structure. However, a TFT may be implemented in other structures such as a staggered structure, and the present disclosure is not limited thereto.

At least a part of the driving transistor DT and the switching transistor included in the pixel circuit may use an oxide semiconductor as an active layer. A TFT using an oxide semiconductor material as an active layer has excellent leakage current blocking effects and is relatively inexpensive to manufacture when compared to a TFT using a polycrystalline semiconductor material as an active layer. Accordingly, in order to reduce power consumption and lower manufacturing costs, the pixel circuit may include the driving transistor DT and at least one switching transistor using the oxide semiconductor material.

All TFTs included in the pixel circuit may be implemented using an oxide semiconductor material, or only some switching transistors may be implemented using an oxide semiconductor material. However, it is difficult to ensure reliability for a TFT using an oxide semiconductor material, and a TFT using a polycrystalline semiconductor material has fast operation speed and excellent reliability. Therefore, one embodiment of the present disclosure may include both a switching TFT using an oxide semiconductor material and a switching transistor using a polycrystalline semiconductor material. Embodiments are not limited thereto. As an example, each of the driving transistor DT and the switching transistor included in the pixel circuit may use any semiconductor such as the oxide semiconductor, the polycrystalline semiconductor, an amorphous semiconductor, a compound semiconductor, or an organic semiconductor, etc., as an active layer.

The driving transistor DT may receive the high-potential voltage EVDD in response to the data signal supplied to the gate electrode 125 thereof and controls a current supplied to the light-emitting device OLED, thereby adjusting the amount of light emission of the light-emitting device OLED, and supply a constant current until a data signal of a next frame is supplied by a voltage with which a storage capacitor (not shown) is charged so that the light-emitting device OLED maintains constant light emission. As an example, a high-potential supply line may be formed parallel to the data line, without being limited thereto.

The driving transistor DT may include the semiconductor layer 115 disposed on a first insulating layer 110, the gate electrode 125 overlapping the semiconductor layer 115 with a second insulating layer 120 therebetween, and the source and drain electrodes 140 formed on a third insulating layer 135 and in contact with the semiconductor layer 115.

The semiconductor layer 115 may be an area where a channel of the driving transistor DT is formed. The semiconductor layer 115 may be formed of an oxide semiconductor, and may be formed of various inorganic or organic semiconductors such as amorphous silicon (a-Si), polycrystalline silicon (poly-Si), or pentacene. However, the present disclosure is not limited thereto. The semiconductor layer 115 may be formed on the first insulating layer 110. The semiconductor layer 115 may include a channel region, a source region, and a drain region. The channel region may overlap the gate electrode 125 with the first insulating layer 110 therebetween to form a channel region between the source and drain electrodes 140. The source region may be electrically connected to the source electrode 140 through a contact hole penetrating the second insulating layer 120 and the third insulating layer 135. The drain region may be electrically connected to the drain electrode 140 through the contact hole penetrating the second insulating layer 120 and the third insulating layer 135. A buffer layer 105 and the first insulating layer 110 may be disposed between the semiconductor layer 115 and the substrate 101. The buffer layer 105 may delay diffusion of moisture and/or oxygen penetrating the substrate 101. The first insulating layer 110 protects the semiconductor layer 115 and may block various types of defects flowing in from the substrate 101.

As an example, the buffer layer 105 may be formed of a single layer or multiple layers. As an example, an uppermost layer of the buffer layer 105 in contact with the first insulating layer 110 may be formed of a material having a different etching property from that of the other layers of the buffer layer 105, the first insulating layer 110, the second insulating layer 120, and the third insulating layer 135. The uppermost layer of the buffer layer 105 in contact with the first insulating layer 110 may be formed of any one of silicon nitride (SiNx) and silicon oxide (SiOx)), without being limited thereto. The other layers of the buffer layer 105, the first insulating layer 110, the second insulating layer 120, and the third insulating layer 135 may be formed of the other one of silicon nitride (SiNx) and silicon oxide (SiOx), without being limited thereto. For example, the uppermost layer of the buffer layer 105 in contact with the first insulating layer 110 may be formed of silicon nitride (SiNx), and the other layers of the buffer layer 105, the first insulating layer 110, the second insulating layer 120, and the third insulating layer 135 may be formed of silicon oxide (SiOx). However, the present disclosure is not limited thereto.

The gate electrode 125 may be formed on the second insulating layer 120 and may overlap the channel region of the semiconductor layer 115 with the second insulating layer 120 interposed therebetween. The gate electrode 125 may be formed of a single-layer or multilayer of first conductive material including any one of magnesium (Mg), molybdenum (Mo), aluminum (Al), chromium (Cr), gold (Au), titanium (Ti), nickel (Ni), neodymium (Nd), and copper (Cu) or an alloy thereof. However, the present disclosure is not limited thereto.

The source electrode 140 may be connected to the source region of the semiconductor layer 115 exposed through the contact hole penetrating the second insulating layer 120 and the third insulating layer 135. The drain electrode 140 faces the source electrode 140 and may be connected to the drain region of the semiconductor layer 115 through the contact hole penetrating the second insulating layer 120 and the third insulating layer 135.

The source region and the drain region may be regions in which an intrinsic polycrystalline semiconductor material is doped with impurity ions, such as group 5 or group 3 impurity ions, for example, phosphorus (P) or boron (B) at a predetermined concentration and made conductive. In the channel region, the semiconductor material (e.g., a polycrystalline semiconductor material or an oxide semiconductor material) maintains an intrinsic state and a path for movement of electrons or holes may be provided.

The source and drain electrodes 140 may be formed of a single-layer or multilayer of second conductive material including any one of molybdenum (Mo), aluminum (Al), chromium (Cr), gold (Au), titanium (Ti), nickel (Ni), neodymium (Nd), and copper (Cu) or an alloy of two or more thereof. However, the present disclosure is not limited thereto.

A connection electrode 155 may be disposed between a first intermediate layer 150 and a second intermediate layer 160. The connection electrode 155 may be exposed through a connection electrode contact hole 156 penetrating a protective film 145 and the first intermediate layer 150 and connected to the drain electrode 140. The connection electrode 155 may be made of a material having low specific resistance that is the same as or similar to that of the drain electrode 140. However, the present disclosure is not limited thereto. As an example, the connection electrode 155 may be made of a material different from that of the drain electrode 140. As an example, the connection electrode 155 may be omitted depending on the design.

The light-emitting device OLED including a light-emitting layer 172 may be disposed on the second intermediate layer 160 and a bank layer 165. The light-emitting device OLED may include an anode 171, at least one light-emitting layer 172 formed on the anode 171, and a cathode 173 formed on the light-emitting layer 172.

The anode 171 may be disposed on the first intermediate layer 150 through a contact hole penetrating the second intermediate layer 160, and electrically connected to the connection electrode 155 exposed on an bottom surface part of the second intermediate layer 160. Embodiments are not limited thereto. In the case where the connection electrode 155 is omitted, the anode 171 may be directly electrically connected to drain electrode 140.

The anode 171 may be formed to be exposed by the bank layer 165. The bank layer 165 may be formed of an opaque material (for example, black) to reduce or prevent light interference between adjacent subpixels. In this case, the bank layer 165 may include a light-blocking material made of at least one of color pigment, organic black, or carbon, etc. However, the present disclosure is not limited thereto. As an example, the bank layer 165 may be formed of a transparent material or a semi-transparent material.

At least one light-emitting layer 172 may be formed on the anode 171 in a light-emitting area provided by the bank layer 165. The at least one light-emitting layer 172 includes a hole transport layer, a hole injection layer, a hole blocking layer, the light-emitting layer 172, an electron injection layer, an electron blocking layer, an electron transport layer, etc., on the anode 171, and may be formed by stacking in sequential or reverse order depending on the direction of light emission. Embodiments are not limited thereto. As an example, at least one of the hole transport layer, the hole injection layer, the hole blocking layer, the electron injection layer, the electron blocking layer, and the electron transport layer may be omitted. In addition, the light-emitting layer 172 may include first and second light-emitting stacks facing each other with a charge generation layer interposed therebetween. In this case, the light-emitting layer 172 of one of the first and second light-emitting stacks generates blue light, and the light-emitting layer 172 of the other one of the first and second light-emitting stacks generates yellow-green light, so that white light may be generated through the first and second light-emitting stacks. Embodiments are not limited thereto. As an example, a light of other color such as red, yellow, blue, etc. or an infrared light may be generated through the first and second light-emitting stacks, without being limited thereto. White light generated from the light-emitting stack is incident on a color filter located above or below the light-emitting layer 172, and thus a color image may be created. As another example, a color image may be implemented by generating light of a color corresponding to each pixel in each light-emitting layer 172 without a separate color filter. For example, the light-emitting layer 172 of the red pixel may generate red light, the light-emitting layer 172 of the green pixel may generate green light, and the light-emitting layer 172 of the blue pixel may generate blue light. The cathode 173 may be formed to face the anode 171 with the light-emitting layer 172 interposed therebetween.

An encapsulation layer 180 may block external moisture or oxygen from penetrating into the light-emitting device OLED. To this end, the encapsulation layer 180 may include at least one layer of an inorganic encapsulation layer and at least one layer of an organic encapsulation layer. However, the present disclosure is not limited thereto. In the present disclosure, a structure of the encapsulation layer 180, in which a first encapsulation layer 181, a second encapsulation layer 182, and a third encapsulation layer 183 are sequentially stacked, will be described as an example.

The first encapsulation layer 181 may be formed on the substrate 101 on which the cathode 173 is formed. The third encapsulation layer 183 is formed on the substrate 101 on which the second encapsulation layer 182 is formed, and may be formed to surround upper, lower, and side surfaces of the second encapsulation layer 182 together with the first encapsulation layer 181. The first encapsulation layer 181 and the third encapsulation layer 183 may minimize or prevent external moisture or oxygen from penetrating into the light-emitting device OLED. The first encapsulation layer 181 and the third encapsulation layer 183 may be made of an inorganic insulating material. As an example, at least one of the first encapsulation layer 181 and the third encapsulation layer 183 may be made of an inorganic insulating material that may undergo low-temperature deposition, such as silicon nitride (SiNx), silicon oxide (SiOx), silicon oxynitride (SiON), or aluminum oxide (Al2O3). Since the first encapsulation layer 181 and/or the third encapsulation layer 183 may be deposited in a low-temperature atmosphere, the light-emitting device OLED vulnerable to a high-temperature atmosphere may be reduced or prevented from being damaged during a deposition process of the first encapsulation layer 181 and/or the third encapsulation layer 183.

The second encapsulation layer 182 serves as a buffer to relieve stress between respective layers due to bending of the display device and may flatten a step between respective layers. The second encapsulation layer 182 may be made of a non-photosensitive organic insulating material such acryl resin, epoxy resin, phenolic resin, polyamide resin, polyimide resin, polyethylene, or silicon oxycarbide (SiOC), or a photosensitive organic insulating material such as photoacryl on the substrate 101 on which the first encapsulation layer 181 is formed. However, the present disclosure is not limited thereto. When the second encapsulation layer 182 is formed using an inkjet method, a dam DAM may be disposed to prevent the second encapsulation layer 182 in liquid form from spreading to an edge of the substrate 101. The dam DAM may be disposed closer to the edge of the substrate 101 than the second encapsulation layer 182. The dam DAM may prevent the second encapsulation layer 182 from spreading into a pad region where a conductive pad disposed on an outermost side of the substrate 101 is disposed.

Even though the dam DAM is designed to prevent spread of the second encapsulation layer 182, when the second encapsulation layer 182 is formed to exceed a height of the dam DAM during a process, the second encapsulation layer 182, which is an organic layer, may be exposed to the outside ambient surroundings, and thus moisture, etc., may penetrate into the light-emitting device OLED. Therefore, to prevent this phenomenon, at least 11 dams DAMs may be formed to overlap.

The dam DAM may be disposed on the protective film 145 in the non-display area NA. In addition, the dam DAM may be formed simultaneously with the first intermediate layer 150 and the second intermediate layer 160. When the first intermediate layer 150 is formed, a lower layer of the dam DAM is also formed, and when the second intermediate layer 160 is formed, an upper layer of the dam DAM is also formed, so that a double structure may be formed by stacking. Accordingly, the dam DAM may be made of the same insulating material that of as the first intermediate layer 150 and the second intermediate layer 160. However, the present disclosure is not limited thereto. As an example, the dam DAM may be formed separately from the first intermediate layer 150 and/or the second intermediate layer 160.

The dam DAM may be formed by overlapping with a low-potential driving power supply line EVSS. For example, in the non-display area NA, the low-potential driving power supply line EVSS may be formed in a lower layer of a region where the dam DAM is located. As an example, at least a portion of the low-potential driving power supply line EVSS may overlap at least one of the dams DAM.

The gate driver 300, which is formed in the form of t GIP (Gate-In-Panel), is formed to surround the outside of the display panel 100, and the low-potential driving power supply line EVSS may be located on the outside of the gate driver 300 itself. Even though the gate driver 300 is simply expressed in drawings of plan and cross-sectional views, the gate driver 300 may have the same or similar structure as that of the driving transistor DT in the display area AA, without being limited thereto.

The low-potential driving power supply line EVSS may be disposed in circuits located outside of the gate driver 300. The low-potential driving power supply line EVSS may be disposed outside the gate driver 300 and disposed to surround the display area AA. The low-potential driving power supply line EVSS may be made of the same material as the source and drain electrodes 140 of the TFT. However, the present disclosure is not limited thereto. For example, the low-potential driving power supply line EVSS may be made of the same material as that of the gate electrode 125. For example, the low-potential driving power supply line EVSS may be made of a material different from that of the gate electrode 125, and the source and drain electrodes 140 of the TFT. In addition, the low-potential driving power supply line EVSS may be electrically connected to the cathode 173. The low-potential driving power supply line EVSS may supply the low-potential voltage EVSS to a plurality of pixels in the display area AA.

A touch layer 190 may be disposed on the encapsulation layer 180. In the touch layer 190, a touch buffer film 191 may be located between a touch sensor metal including touch electrode connection lines 192 and 194 and touch electrodes 195 and 196, and the cathode 173 of the light-emitting device OLED. As an example, the touch layer 190 may be omitted depending on the design.

The touch buffer film 191 may block chemical solutions (developer, etchant, etc.) used in a manufacturing process of the touch sensor metal disposed on the touch buffer film 191, moisture from the outside, etc., from infiltrating into the light-emitting layer 172 containing organic substances. Accordingly, the touch buffer film 191 may prevent or reduce damage to the light-emitting layer 172, which is vulnerable to chemicals or moisture.

As an example, the touch buffer film 191 may be formed at a low temperature less than or equal to a certain temperature (for example, 100° C.) to reduce or prevent damage to the light-emitting layer 172 containing organic substances vulnerable to high temperatures, without being limited thereto. As an example, the touch buffer film 191 may be formed of an organic insulating material having a low dielectric constant of 1 to 3, without being limited thereto. For example, the touch buffer film 191 may be formed of an acrylic-based, epoxy-based, or siloxane-based material. The touch buffer film 191, which is made of an organic insulating material and has flattening performance, may reduce or prevent damage to the encapsulation layer 180 due to bending of the organic light-emitting display device and cracking of the touch sensor metal formed on the touch buffer film 191.

According to a mutual-capacitance-based touch sensor structure, the touch electrodes 195 and 196 may be disposed on the touch buffer film 191, and the touch electrodes 195 and 196 may be disposed to cross each other.

The touch electrode connection lines 192 and 194 may electrically connect the touch electrodes 195 and 196 to each other. The touch electrode connection lines 192 and 194 and the touch electrodes 195 and 196 may be located in different layers with the touch insulating film 193 interposed therebetween. The touch electrode connection lines 192 and 194 are arranged to overlap the bank layer 165, thereby reducing or preventing a decrease in aperture ratio, without being limited thereto. As an example, at least a portion of the touch electrode connection lines 192 and 194 may not vertically overlap the bank layer 165. As an example, at least some of the touch electrode connection lines 192 and 194 may be formed of a transparent conductive oxide (TCO) such as ITO or IZO, without being limited thereto.

Meanwhile, the touch electrodes 195 and 196 may be electrically connected to a touch driving circuit (not shown) through a touch pad 198 by a part of the touch electrode connection line 192 passing through upper and side surfaces of the encapsulation layer 180 and upper and side surfaces of the dam DAM.

A part of the touch electrode connection line 192 may receive a touch driving signal from the touch driving circuit and transmit the touch driving signal to the touch electrodes 195 and 196, and transmit a touch sensing signal from the touch electrodes 195 and 196 to the touch driving circuit.

A touch protective film 197 may be disposed on the touch electrodes 195 and 196. In the drawing, the touch protective film 197 is shown as being disposed only on the touch electrodes 195 and 196. However, the present disclosure is not limited thereto, and the touch protective film 197 may extend to a front or rear of the dam DAM and be disposed on the touch electrode connection line 192. As an example, the touch protective film 197 may extend to a front or rear of the dam DAM.

In addition, a color filter (not shown) may be further disposed on the encapsulation layer 180, and the color filter may be located on the touch layer 190, or may be located between the encapsulation layer 180 and the touch layer 190. As an example, the color filter may be omitted depending on the design.

Figure 3:
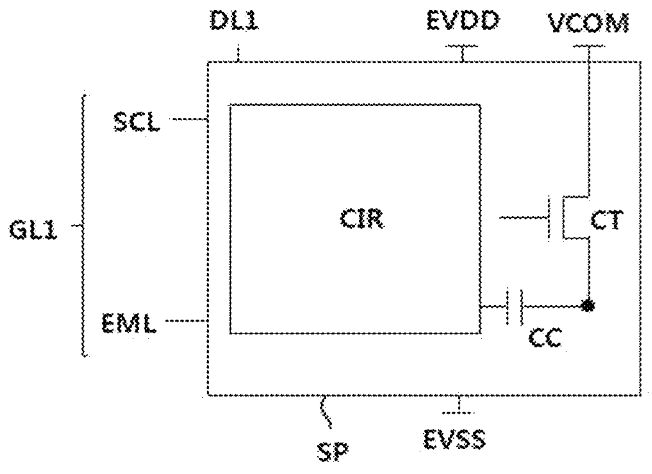
FIG. 3 is a diagram illustrating a compensation circuit included in a subpixel according to a first embodiment of the present disclosure.
Figure 4:
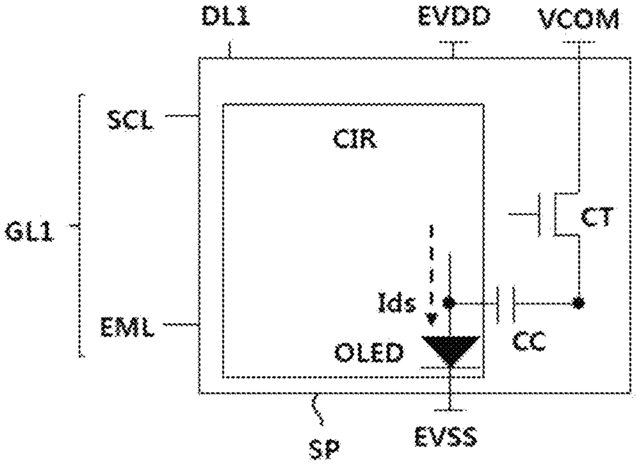
FIG. 4 is a diagram illustrating an operation of the compensation circuit according to the first embodiment of the present disclosure.
Figure 5:
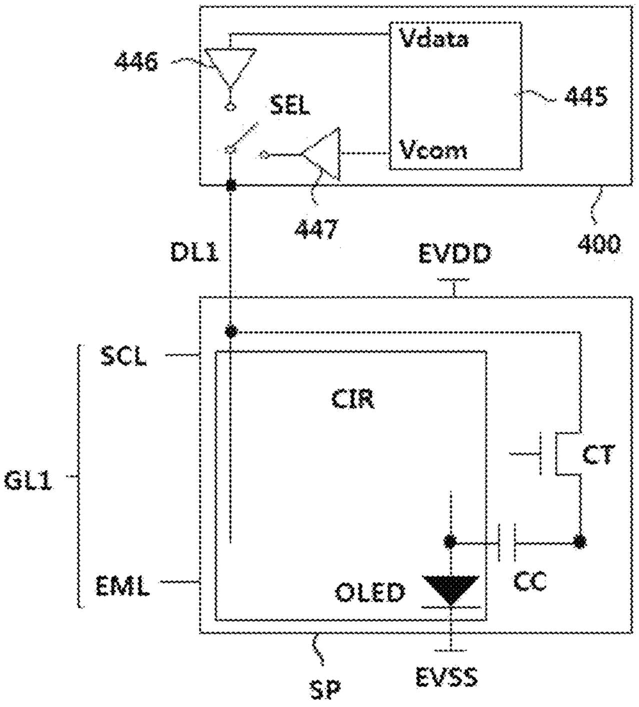
FIG. 5 is a diagram for describing a data driver configured to drive the compensation circuit according to the first embodiment of the present disclosure.

FIG. 3 is a diagram illustrating a compensation circuit included in a subpixel according to a first embodiment of the present disclosure, FIG. 4 is a diagram illustrating an operation of the compensation circuit according to the first embodiment of the present disclosure, and FIG. 5 is a diagram for describing the data driver configured to drive the compensation circuit according to the first embodiment of the present disclosure.

As shown in FIG. 3, the subpixel SP according to the first embodiment may be defined by a first data line DL1, a first gate line GL1, a high-potential voltage line EVDD, a low-potential voltage line EVSS, and a compensation voltage line VCOM. The first gate line GL1 may include a scan line SCL, a light emission control line EML, etc.

The subpixel SP may include a pixel circuit CIR, compensation circuits CC and TC, etc. The compensation circuits CC and TC may include a compensation capacitor CC and a compensation transistor CT. The compensation capacitor CC may have a first electrode connected to the pixel circuit CIR and a second electrode connected to a first electrode of the compensation transistor CT. The compensation transistor CT may have a first electrode connected to the second electrode of the compensation capacitor CC, a second electrode connected to the compensation voltage line VCOM, and a gate electrode connected to a compensation scan line.

As shown in FIG. 4, the compensation circuits CC and TC may apply, to the pixel circuit CIR, a compensation voltage capable of compensating for deviation of a driving current Ids due to a difference in device characteristics between subpixels after threshold voltage compensation. For example, the compensation circuit CC and TC may serve to apply a compensation voltage capable of compensating for the driving current Ids applied to the anode of the light-emitting device OLED included in the pixel circuit CIR. To this end, the compensation capacitor CC may be connected to a point where the driving current is applied, such as the anode of the light-emitting device OLED.

Meanwhile, even though FIGS. 3 and 4 illustrate and describe that the compensation voltage line VCOM is separated from the first data line DL1 and arranged as a separate line as an example, a configuration shown in FIG. 5 may be adopted.

As shown in FIG. 5, the compensation transistor CT may have a first electrode connected to the second electrode of the compensation capacitor CC, a second electrode connected to the first data line DL1, and a gate electrode (control electrode) connected to the control line (scan line). That is, the compensation transistor CT may receive a compensation voltage through the first data line DL1 rather than a separate compensation voltage line.

In this way, in the case of a line sharing type in which a line that transmits the compensation voltage as well as the data voltage to the subpixel SP is configured by the first data line DL1, the data driver 400 may output the data voltage Vdata and a compensation voltage Vcom with a time difference. To this end, the data driver 400 may include a voltage generator 445, a voltage selector SEL, a first voltage output circuit 446, and a second voltage output circuit 447.

The voltage generator 445 may generate one of the data voltage Vdata and the compensation voltage Vcom. The first voltage output circuit 446 may output the data voltage Vdata generated from the voltage generator 445. The second voltage output circuit 447 may output the compensation voltage Vcom generated from the voltage generator 445. The voltage selector SEL may selectively output one of the data voltage Vdata and the compensation voltage Vcom through the first data line DL1. Note that FIG. 5 is a simplified illustration to aid understanding of the devices included within the data driver 400.

Meanwhile, the compensation circuit according to the first embodiment of the present disclosure may be applied to all subpixels in which deviation in driving current Ids occurs due to differences in device characteristics between subpixels after threshold voltage compensation. However, to aid in understanding related to the compensation circuit according to the first embodiment of the present disclosure, application to a 6T (Transistor) 1C (Capacitor) subpixel including six n-type transistors and one capacitor is described as an example. Embodiments are not limited thereto. As an example, more or less transistors and/or capacitors could be included. In addition, as an example, the compensation circuit according to the first exemplary embodiment of the present disclosure may be applied to at least some of the subpixels in which deviation in driving current Ids frequently occurs, without being limited thereto. In addition, the transistors included in the subpixel may include either n-type transistors or p-type transistors.

Figure 6:
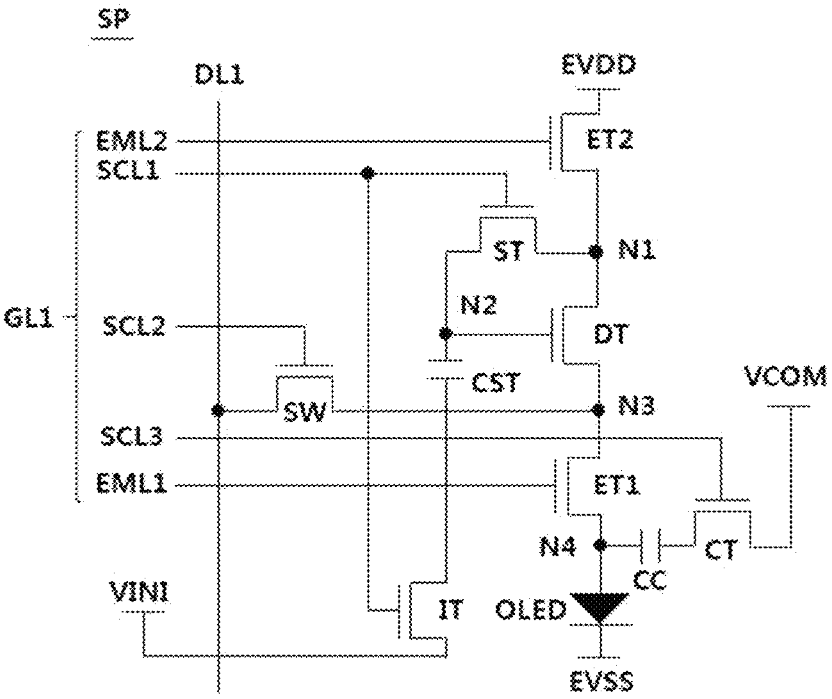
FIG. 6 is a diagram illustrating a subpixel including a compensation circuit according to a second embodiment of the present disclosure.
Figure 7:
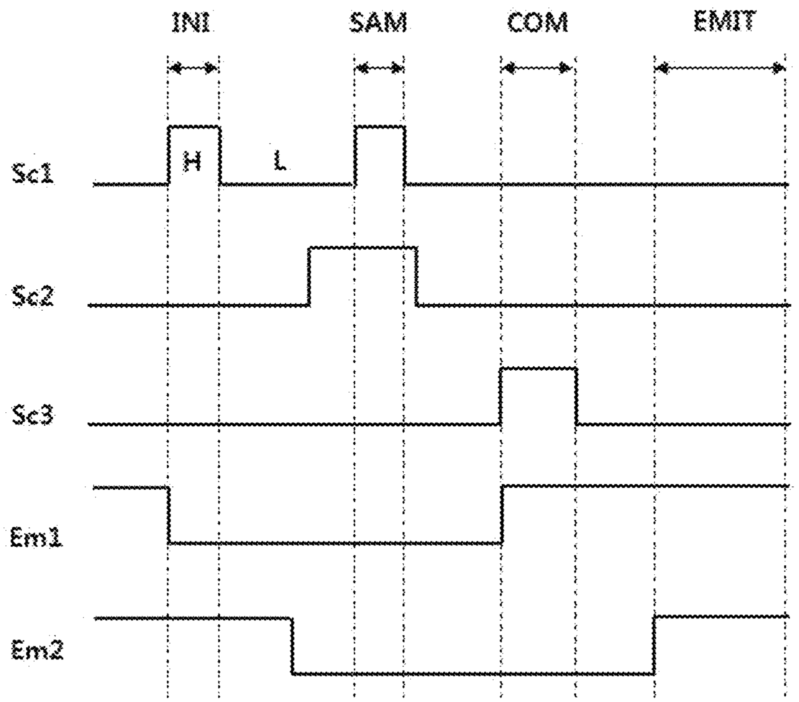
FIG. 7 is a waveform diagram for describing an operation of the subpixel including the compensation circuit according to the second embodiment of the present disclosure.
Figure 8:
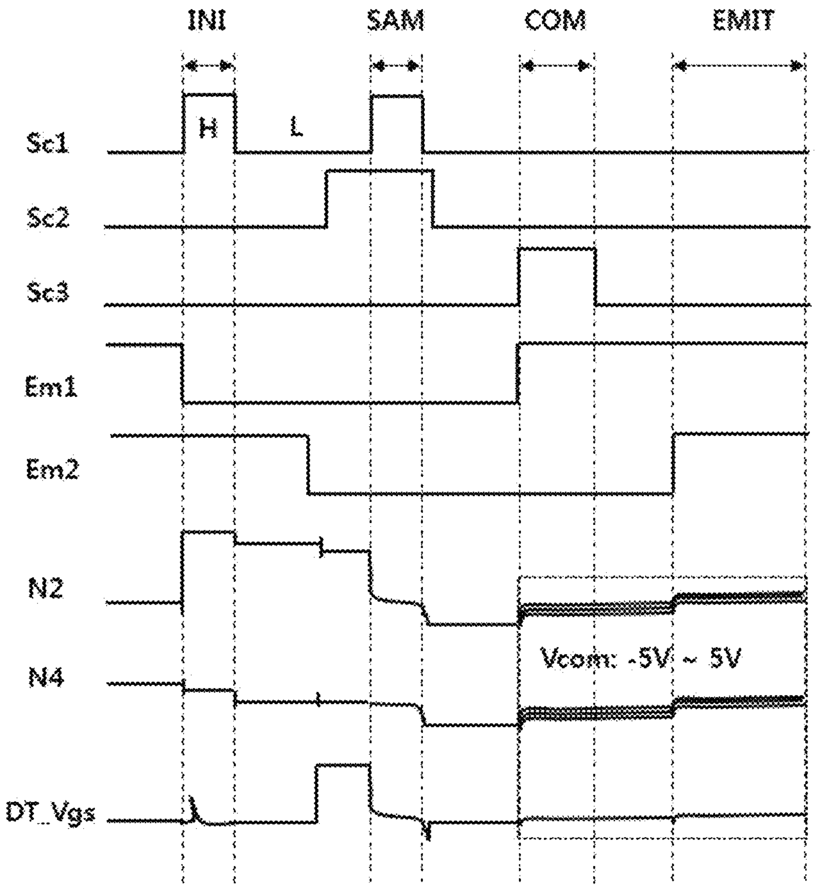
FIGS. 8 and 9 are waveform diagrams illustrating changes in voltage and current according to a driving waveform shown in FIG. 7.
Figure 9:
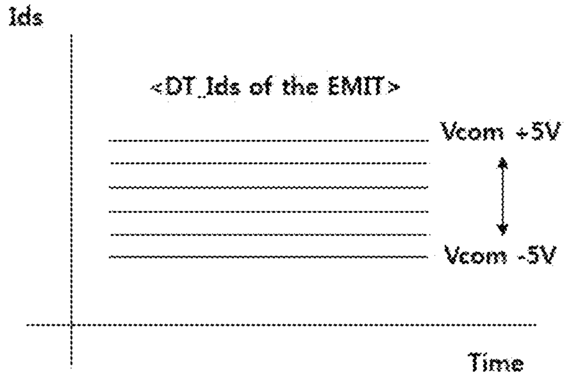
Figure 10:
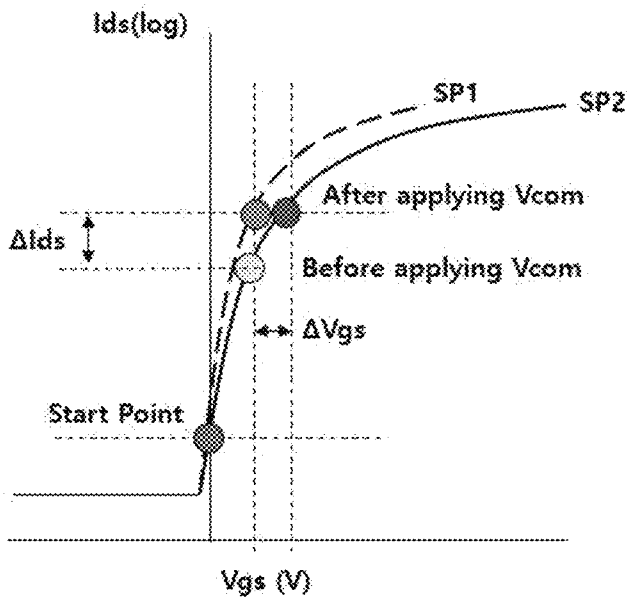
FIG. 10 is a diagram illustrating a difference before and after compensation operation according to the second embodiment of the present disclosure.

FIG. 6 is a diagram illustrating a subpixel including a compensation circuit according to a second embodiment of the present disclosure, FIG. 7 is a waveform diagram for describing an operation of the subpixel including the compensation circuit according to the second embodiment of the present disclosure, FIGS. 8 and 9 are waveform diagrams illustrating changes in node voltage and current according to a driving waveform shown in FIG. 7, and FIG. 10 is a diagram illustrating a difference before and after compensation operation according to the second embodiment of the present disclosure.

As shown in FIGS. 6 and 7, the subpixel SP according to the second embodiment may include a switching transistor SW, an initialization transistor IT, a sampling transistor ST, a driving transistor DT, a first light emission control transistor ET1, a second light emission control transistor ET2, a capacitor CST, an organic light-emitting diode OLED, a compensation capacitor CC, and a compensation transistor CT.

The switching transistor SW may have a gate electrode connected to a second scan line SCL2, a first electrode connected to the first data line DL1, and a second electrode connected to a third node N3. The switching transistor SW may be turned on by a second scan signal Sc2 applied through the second scan line SCL2 to transmit a data voltage applied through the first data line DL1 to the third node N3.

The initialization transistor IT may have a gate electrode connected to a first scan line SCL1, a first electrode connected to the initialization line VINI, and a second electrode connected to a first electrode of the capacitor CST. The initialization transistor IT may be turned on by the first scan signal Sc1 applied through the first scan line SCL1 to transmit the initialization voltage applied through the initialization line VINI to the first electrode of the capacitor CST.

The sampling transistor ST may have a gate electrode connected to the first scan line SCL1, a first electrode connected to a first node N1 defined as a first electrode of the driving transistor DT, and a second electrode connected to a second node N2 defined as a gate electrode of the driving transistor DT. The sampling transistor ST may be turned on by the first scan signal Sc1 applied through the first scan line SCL1 to connect the gate electrode and the first electrode of the driving transistor DT (diode connection), thereby enabling threshold voltage sampling for threshold voltage compensation.

The driving transistor DT may have the gate electrode connected to the second node N2, the first electrode connected to the first node N1, and a second electrode connected to the third node N3. The driving transistor DT may operate based on a data voltage stored in the capacitor CST and generate a driving current.

The first light emission control transistor ET1 may have a gate electrode connected to a first light emission control line EML1, a first electrode connected to the third node N3, and a second electrode connected to a fourth node N4. The first light emission control transistor ET1 may be turned on by a first light emission control signal Em1 applied through the first light emission control line EML1 to transmit a driving current generated from the driving transistor DT to the organic light-emitting diode OLED.

The second light emission control transistor ET2 may have a gate electrode connected to a second light emission control line EML2, a first electrode connected to the high-potential voltage line EVDD, and a second electrode connected to the first node N1. The second light emission control transistor ET2 may be turned on by a second light emission control signal Em2 applied through the second light emission control line EML2 to transmit a high-potential voltage to the first node N1.

The capacitor CST may have a first electrode connected to the second electrode of the initialization transistor IT and a second electrode connected to the second node N2. The capacitor CST may store a data voltage reflecting a threshold voltage of the driving transistor DT based on an operation of the sampling transistor ST.

The organic light-emitting diode OLED may have an anode connected to the fourth node N4 and a cathode connected to the low-potential voltage line EVSS. The organic light-emitting diode OLED may operate based on a driving current generated from the driving transistor DT and a compensation voltage (compensation value) delivered from the compensation capacitor CC and emit light.

The compensation capacitor CC may have a first electrode connected to the fourth node N4 and a second electrode connected to a first electrode of the compensation transistor CT. The compensation capacitor CC may transmit a compensation voltage delivered through the compensation transistor CT to the fourth node N4. The compensation voltage may be selected as a voltage capable of compensating for driving current deviation ΔIds that may occur between subpixels after threshold voltage compensation to a similar level by changing a gate-source voltage of the driving transistor DT.

The compensation transistor CT may have a gate electrode connected to a third scan line SCL3, the first electrode connected to the compensation capacitor CC, and a second electrode connected to the compensation voltage line VCOM. The compensation transistor CT may be turned on by a third scan signal Sc3 applied through the third scan line SCL3 to transmit a compensation voltage to the second electrode of the compensation capacitor CC.

In some embodiments, the compensation capacitor CC is disposed to be adjacent to an anode of a light-emitting diode OLED included in the subpixel SP. In some embodiments, the compensation capacitor CC is directly and electrically connected to an anode of a light-emitting diode OLED included in the subpixel SP (see FIG. 6).

According to the second embodiment, the subpixel SP including the compensation circuits CC and CT may operate in order of an initialization period INI, a sampling period SAM, a compensation period COM, and a light emission period EMIT, which will be described as follows.

The first scan signal Sc1 may be applied as an on-voltage H during the initialization period INI and the sampling period SAM and may be applied as an off-voltage L during the remaining period. The first scan signal Sc1 may be applied as an on-voltage H in response to the initialization period INI and the sampling period SAM.

The second scan signal Sc2 may be applied as an on-voltage H during the sampling period SAM and may be applied as an off-voltage L during the remaining period. The second scan signal Sc2 may be applied as an on-voltage H for a longer time than an application time of the on-voltage H of the first scan signal Sc1 applied during the sampling period SAM.

The third scan signal Sc3 may be applied as an on-voltage H during the compensation period COM and may be applied as an off-voltage L during the remaining period. The third scan signal Sc3 may be applied as on-voltage H in response to the compensation period COM.

The first light emission control signal Em1 may be applied as an on-voltage H during the compensation period COM and the light emission period EMIT and may be applied as an off-voltage L during the remaining period. The first light emission control signal Em1 may be applied as an on-voltage H after the light emission period EMIT and before start of the initialization period INI.

The second light emission control signal Em2 may be applied as an on-voltage H during the initialization period INI and light emission period EMIT and may be applied as an off-voltage L during the remaining period. The second light emission control signal Em2 may be applied as an on-voltage H after the initialization period INI until between the initialization period INI and the sampling period SAM.

As shown in FIGS. 6, 8, and 9, the subpixel SP according to the second embodiment may be supplied with one compensation voltage selected from voltages-5 V to 5 V having a range from a negative voltage to a positive voltage during the compensation period COM. The compensation voltage Vcom may be reflected in the driving transistor DT through the turned-on first light emission control transistor ET1, which can be understood with reference to waveforms showing a change in the second node N2, the fourth node N4, and the gate-source voltage DT_Vgs of the driving transistor DT after the compensation voltage Vcom is applied as shown in FIG. 8, and a change in a current DT_Ids flowing through the driving transistor DT during the light emission period EMIT as shown in FIG. 9.

FIGS. 8 and 9 illustrate and describe an example in which the compensation voltage Vcom is applied at −5 V to 5 V. However, the compensation voltage Vcom may be set considering a level capable of compensating for a difference in driving current between subpixels. A result of simulation shows that, when one compensation voltage Vcom selected from voltages of −2 V to 2 V is applied to the subpixel SP shown in FIG. 6, driving current deviation between all subpixels SP can be compensated. Embodiments are not limited thereto. As an example, the compensation voltage Vcom may be selected from voltages different from −2 V to 2 V, or −5 V to 5 V. As an example, the compensation voltage Vcom may be selected from voltages of −3 V to 3 V, −6V to 10 V, etc.

As shown in FIG. 10, even when a first subpixel SP1 and a second subpixel SP2 are driven by compensating for threshold voltages under the same conditions, transfer curve characteristics may vary depending on device characteristics (S-factor, etc.). For this reason, deviation in the driving current Ids may be caused between the first subpixel SP1 and the second subpixel SP2.

However, it can be seen that, when the compensation voltage Vcom is applied to the second subpixel SP2 according to the second embodiment, the gate-source voltage Vgs of the driving transistor changes, and thus deviation of the driving current Ids caused between the first subpixel SP1 and the second subpixel SP2 may be sufficiently compensated, which can be seen by comparing before and after applying the compensation voltage Vcom to the second subpixel SP2.

Figure 11:
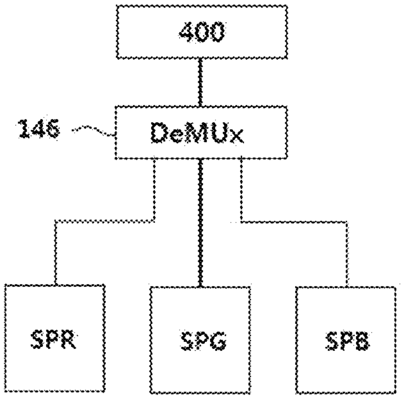
FIGS. 11 to 13 are diagrams illustrating a subpixel including a compensation circuit and a data driver according to a third embodiment of the present disclosure.
Figure 12:
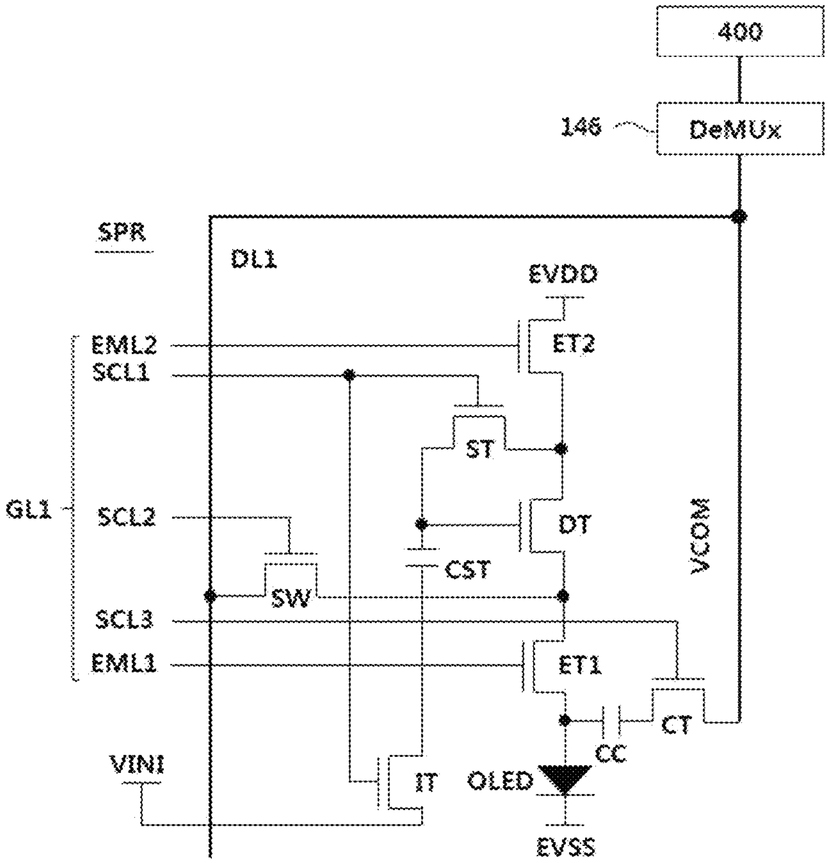
Figure 13:
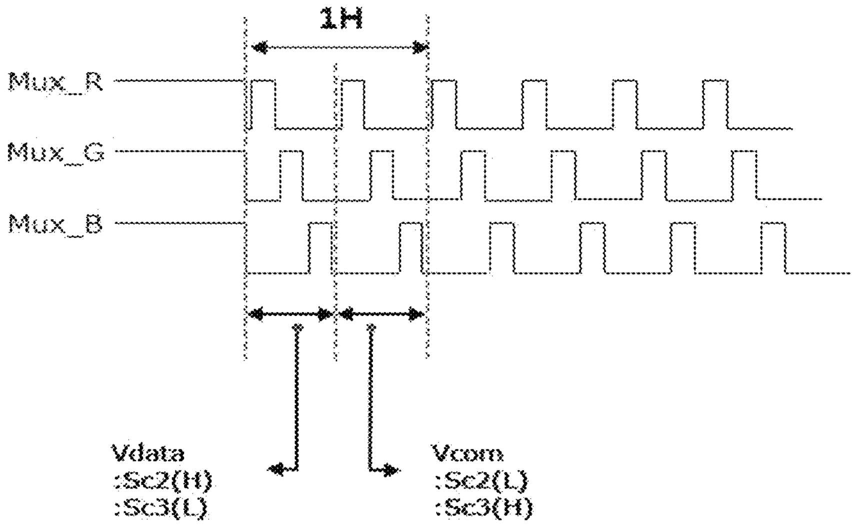
Figure 14:
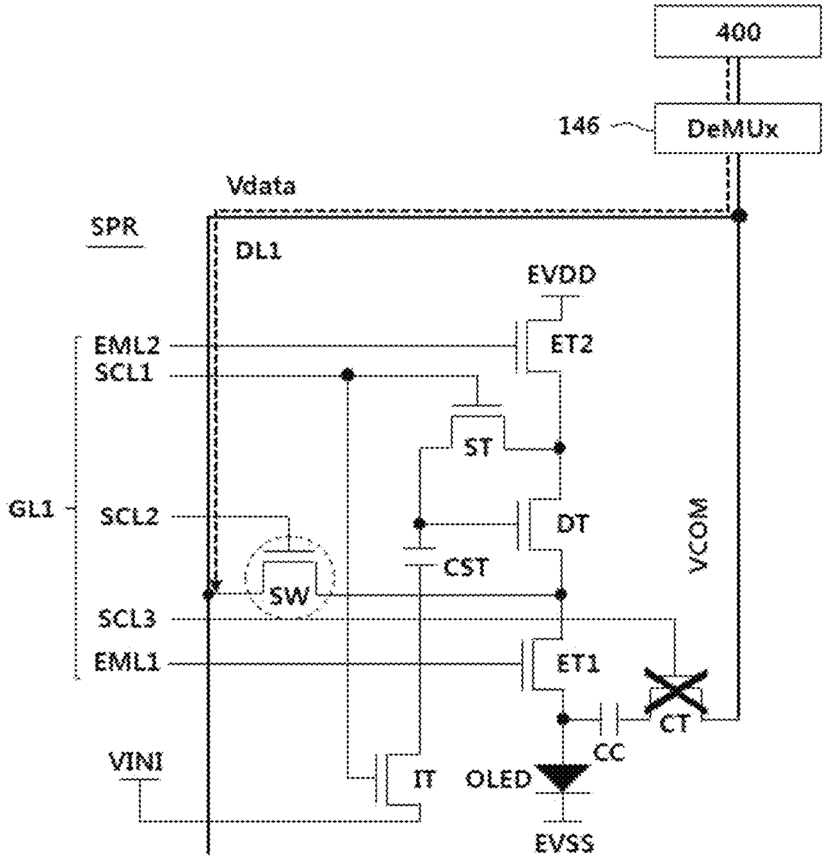
FIGS. 14 and 15 are diagrams for describing a voltage transmission method according to the third embodiment of the present disclosure.
Figure 15:
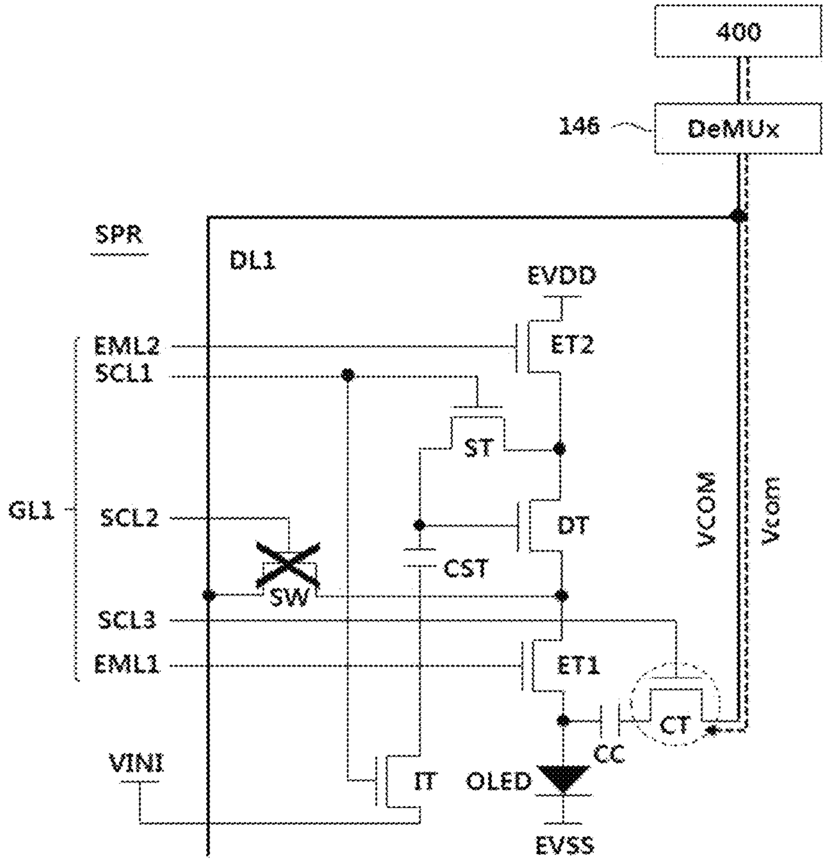

FIGS. 11 to 13 are diagrams illustrating a subpixel including a compensation circuit and a data driver according to a third embodiment of the present disclosure, and FIGS. 14 and 15 are diagrams for describing a voltage transmission method according to the third embodiment of the present disclosure.

As shown in FIG. 11, according to the third embodiment, it is possible to include a red subpixel SPR, a green subpixel SPG, and a blue subpixel SPB. The data driver 400 may be connected to a DeMux 146, and the red subpixel SPR, the green subpixel SPG, and the blue subpixel SPB may be connected to the DeMux 146. A structure using the DeMux 146 may reduce the number of output channels of the data driver 400, thereby reducing or minimizing a size of an integrated circuit included in the data driver 400.

As shown in FIG. 12, when the red subpixel SPR is examined as an example, the red subpixel SPR has the same configuration as that of the subpixel according to the second embodiment described above except for a structure in which the first data line DL1 is connected to the DeMux 146, and thus a description thereof is omitted or briefly give.

As shown in FIGS. 11 and 13, a structure using the DeMux 146 may separately output the data voltage Vdata and the compensation voltage Vcom for 1 horizontal time (1H) in response to mux signals Mux_R, Mux_G, and Mux_B. Meanwhile, in FIG. 13, for convenience of description, the case where the data voltage Vdata and the compensation voltage Vcom are separately output for 1 horizontal time (1H) has been described. However, the present disclosure is not limited thereto. Hereinafter, a process of separately outputting the data voltage Vdata and the compensation voltage Vcom to the red subpixel SPR will be described below as an example.

As shown in FIGS. 13 to 15, the data voltage Vdata may be output to the red subpixel SPR for ½ of 1 horizontal time (1H), and the compensation voltage Vcom may be output to the red subpixel SPR for the remaining ½ time. Embodiments are not limited thereto. As an example, the data voltage Vdata may be output to the red subpixel SPR for less than or more than ½ of 1 horizontal time (1H), and the compensation voltage Vcom may be output to the red subpixel SPR for the remaining time. In order to receive supply of the data voltage Vdata, the red subpixel SPR may receive the second scan signal Sc2 at an on-voltage H and the third scan signal Sc3 at an off-voltage L. Thereafter, in order to receive supply of the compensation voltage Vcom, the red subpixel SPR may receive the second scan signal Sc2 at an off-voltage L and the third scan signal Sc3 at an on-voltage H.

Figure 16:
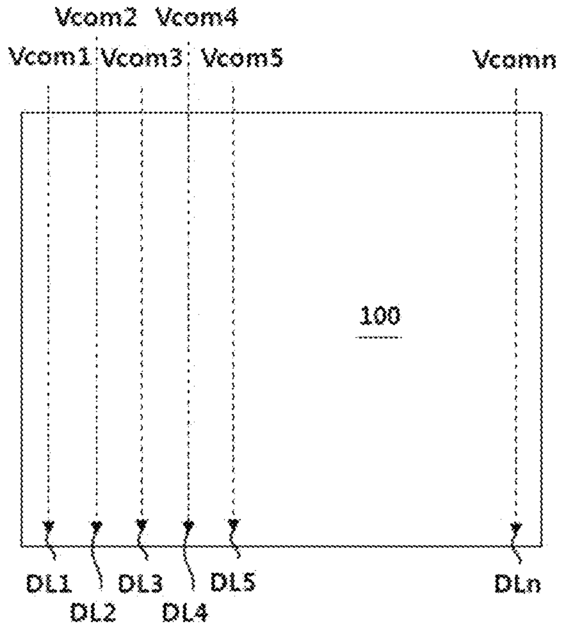
FIGS. 16 and 17 are diagrams for describing a method of applying a compensation voltage according to a fourth embodiment of the present disclosure.
Figure 17:
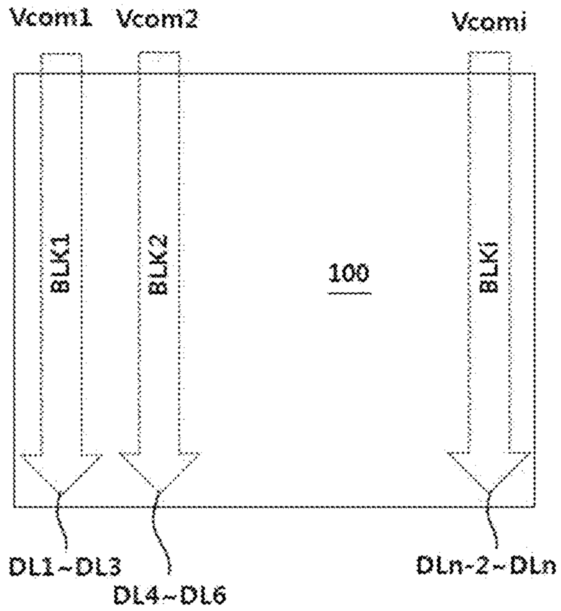

FIGS. 16 and 17 are diagrams for describing a method of applying a compensation voltage according to a fourth embodiment of the present disclosure.

As shown in FIG. 16, according to the fourth embodiment, first to Nth compensation voltages Vcom1 to Vcomn may be separately applied to first to Nth data lines DL1 to DLn of the display panel 100. The first to Nth compensation voltages Vcom1 to Vcomn may be selected and applied at one or more different levels. Here, N may be equal to the number of data lines arranged on the display panel 100. According to FIG. 16, one compensation voltage is supplied to each data line, and the compensation voltage may be applied at one or more different levels for each data line in consideration of the characteristics of the subpixel.

As shown in FIG. 17, according to the fourth embodiment, first to Ith compensation voltages Vcom1 to Vcomi may be separately applied to first to ith data line blocks BLK1 to BLKi of the display panel 100. The first to Ith compensation voltages Vcom1 to Vcomi may be selected and applied at one or more different levels. Here, I may be fewer than the number of data lines arranged on the display panel 100, and one data line block may include at least three data lines, such as "DL1 to DL3, DL4 to DL6, and DLn-2 to DLn." According to FIG. 17, one compensation voltage may be supplied every at least three data lines, and the compensation voltage may be applied at one or more different levels for each data line block, considering the characteristics of the subpixel. Embodiments are not limited thereto. As an example, one data line block may include at least two data lines. As an example, different data line blocks may include the same number of data lines, or different number of data lines. As an example, data line blocks may include different number of data lines depending on the location of the data lines.

Figure 18:
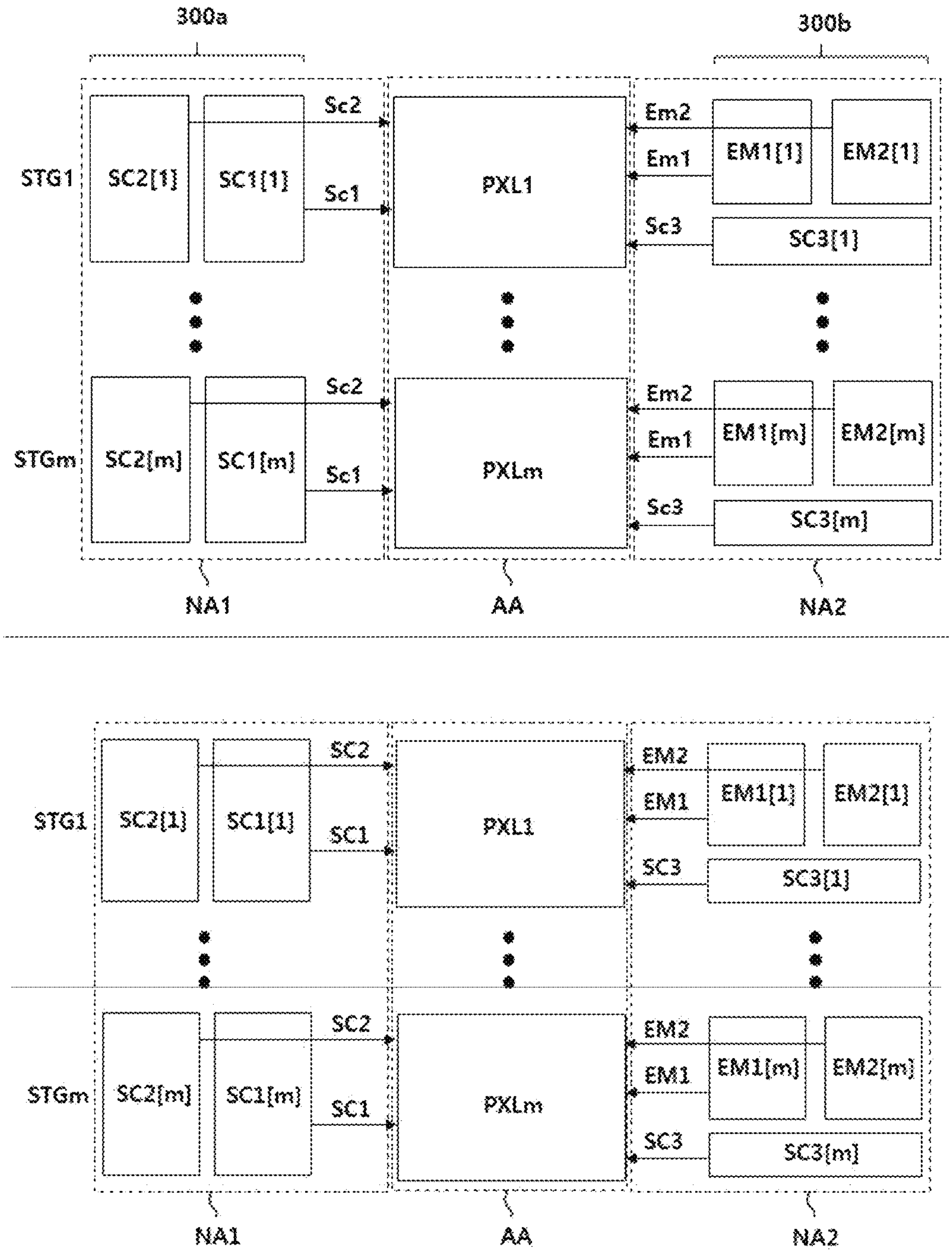
FIG. 18 is a diagram for describing an example of arrangement of a gate driver for supplying a third scan signal added to apply a compensation voltage according to a fifth embodiment of the present disclosure.

FIG. 18 is a diagram for describing an example of arrangement of a gate driver for supplying a third scan signal added to apply a compensation voltage according to a fifth embodiment of the present disclosure.

As shown in FIG. 18, the gate drivers 300*a* and 300*b* according to the fifth embodiment may include a first gate driver 300*a* and a second gate driver 300*b* arranged in a left-right asymmetric manner. The first gate driver 300*a* may be disposed in a first non-display area NA1 (left non-display area), and the second gate driver 300*b* may be disposed in a second non-display area NA2 (right non-display area). Embodiments are not limited thereto. As an example, the first gate driver 300*a* and the second gate driver 300*b* may be disposed in the same side (e.g., in the same non-display area NA1).

The first gate driver 300*a* and the second gate driver 300*b* may be disposed in first to Mth stages STG1 to STGm to selectively drive the first to M pixels PXL1 to PXLm disposed in the display area AA sequentially, reverse sequentially, or randomly. The first to M stages STG1 to STGm may include shift registers.

The first gate driver 300*a* may include first scan signal generators SC1[1] to SC1[m] configured to output the first scan signal Sc1 and second scan signal generators SC2[1] to SC2[m] configured to output the second scan signal Sc2. The first scan signal generators SC1[1] to SC1[m] and the second scan signal generators SC2[1] to SC2[m] may be arranged to be left and right adjacent to each other, without being limited thereto.

The second gate driver 300*b* may include first light emission control signal generators EM1[1] to EM1[m] configured to output the first light emission control signal Em1, second light emission control signal generators EM2[1] to EM2[m] configured to output the second light emission control signal Em2, and third scan signal generators SC3[1] to SC3[m] configured to output the third scan signal Sc3. The first light emission control signal generators EM1[1] to EM1[m] and the second light emission control signal generators EM2[1] to EM2[m] may be arranged to be left and right adjacent to each other, without being limited thereto. The third scan signal generators SC3[1] to SC3[m] may be arranged to be located below or above the first light emission control signal generators EM1[1] to EM1[m] and the second light emission control signal generators EM2[1] to EM2[m], respectively, without being limited thereto. As an example, the third scan signal generators SC3[1] to SC3[m] may also be arranged to be located at left or right side of the first light emission control signal generators EM1[1] to EM1[m] and the second light emission control signal generators EM2[1] to EM2[m], or located between the first light emission control signal generators EM1[1] to EM1[m] and the second light emission control signal generators EM2[1] to EM2[m], without being limited thereto.

Figure 19:
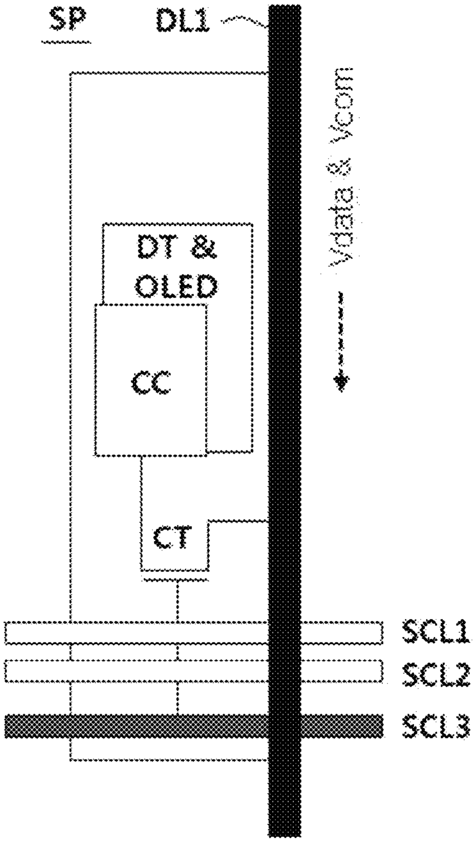
FIG. 19 is a plan view illustrating a simplified planar structure of a subpixel including a compensation circuit according to a sixth embodiment of the present disclosure.
Figure 20:
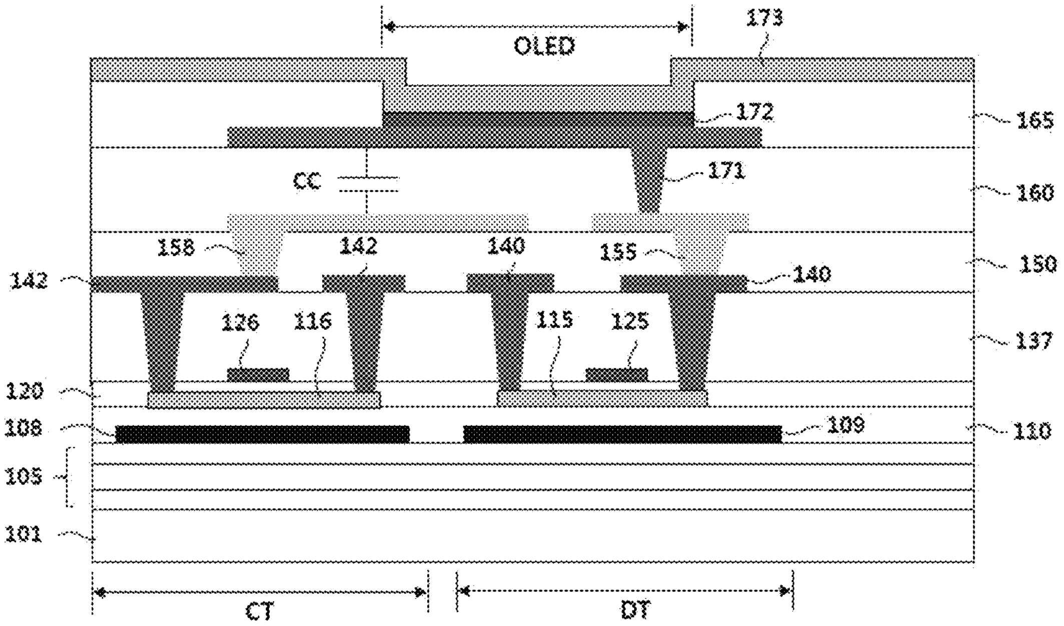
FIG. 20 is a cross-sectional view illustrating an area where an organic light-emitting diode, a driving transistor, a compensation capacitor, and a compensation transistor are located in FIG. 19.

FIG. 19 is a plan view illustrating a simplified planar structure of a subpixel including a compensation circuit according to a sixth embodiment of the present disclosure, and FIG. 20 is a cross-sectional view illustrating an area where an organic light-emitting diode, a driving transistor, a compensation capacitor, and a compensation transistor are located in FIG. 19.

As shown in FIG. 19, according to the sixth embodiment, the subpixel SP including the compensation circuit may be defined by a first data line DL1 arranged in a first direction (vertical direction) and first to third scan lines SCL1 to SCL3 arranged in a second direction (horizontal direction).

The subpixel SP may include an organic light-emitting diode OLED configured to emit light, a driving transistor DT configured to drive the organic light-emitting diode OLED, a compensation capacitor CC, a compensation transistor CT configured to control the compensation capacitor CC, etc. As previously described in other embodiments, the compensation capacitor CC and the compensation transistor CT are compensation circuits configured to supply the compensation voltage Vcom to the subpixel SP. Accordingly, descriptions thereof are given in the previous embodiments, and thus will be omitted or briefly given.

FIG. 19 illustrates an example in which the first to third scan lines SCL1 to SCL3 are arranged in sequence. However, this is only an example, and the order and arrangement position are not limited thereto. Meanwhile, the compensation capacitor CC may be formed to overlap at least part of the organic light-emitting diode OLED, and the compensation transistor CT may be formed based on the same structure as that of the driving transistor DT, which is described as follows. Embodiments are not limited thereto. As an example, the compensation capacitor CC may be formed to not overlap the organic light-emitting diode OLED. As an example, the compensation transistor CT may be formed based on different structure from that of the driving transistor DT.

As shown in FIG. 20, a buffer layer 105 may be disposed on the substrate 101, and a first light blocking layer 108 and a second light blocking layer 109 may be disposed on the buffer layer 105. The first light blocking layer 108 and the second light blocking layer 109 may serve to block an influence (leakage) of incident light incident from a lower part of the compensation transistor CT and the driving transistor DT. As an example, at least one of the first light blocking layer 108 and the second light blocking layer 109 may be omitted depending on the design. As an example, the first light blocking layer 108 and the second light blocking layer 109 may be integrally formed.

A first insulating layer 110 covering the first light blocking layer 108 and the second light blocking layer 109 may be disposed on the buffer layer 105, and a first semiconductor layer 116 and a second semiconductor layer 115 may be disposed on the first insulating layer 110. The first semiconductor layer 116 may overlap the first light blocking layer 108, and the second semiconductor layer 115 may overlap the second light blocking layer 109. The first semiconductor layer 116 may be an active layer of the compensation transistor CT, and the second semiconductor layer 115 may be an active layer of the driving transistor DT. Although it is shown that the first semiconductor layer 116 and the second semiconductor layer 115 are formed on the same layer, embodiments are not limited thereto.

A second insulating layer 120 covering the first semiconductor layer 116 and the second semiconductor layer 115 may be disposed on the first insulating layer 110, and a first gate electrode 126 and a second gate electrode 125 may be disposed on the second insulating layer 120. The first gate electrode 126 may be a gate electrode of the compensation transistor CT, and the second gate electrode 125 may be a gate electrode of the driving transistor DT.

A third insulating layer 137 covering the first gate electrode 126 and the second gate electrode 125 may be disposed on the second insulating layer 120, and first source and drain electrodes 142 and second source and drain electrodes 140 may be disposed on the third insulating layer 137. The first source and drain electrodes 142 may be source and drain electrodes of the compensation transistor CT, and the second source and drain electrodes 140 may be the source and drain electrodes of the driving transistor DT. As an example, the first source and drain electrodes 142 and the second source and drain electrodes 140 may be formed on different layers.

A first intermediate layer 150 covering the first source and drain electrodes 142 and the second source and drain electrodes 140 may be disposed on the third insulating layer 137, and a first connection electrode 158 and a second connection electrode 155 may be disposed on the first intermediate layer 150. The first connection electrode 158 may be a lower electrode (second electrode) of the compensation capacitor CC, and the second connection electrode 155 may be a connection electrode of the driving transistor DT. As an example, the first connection electrode 158 and the second connection electrode 155 may be omitted depending on the design.

The second intermediate layer 160 covering the first connection electrode 158 and the second connection electrode 155 may be disposed on the first intermediate layer 150, and the anode 171 of the organic light-emitting diode OLED may be disposed on the second intermediate layer 160. The anode 171 of the organic light-emitting diode OLED may be extended to overlap the first connection electrode 158. The anode 171 may be connected to the source or drain electrode of the driving transistor DT through the second connection electrode 155. An area of the anode 171 that overlaps the first connection electrode 158 may be an upper electrode (first electrode) of the compensation capacitor CC. That is, the compensation capacitor CC may be formed by the first connection electrode 158, the second intermediate layer 160, and the anode 171. Embodiments are not limited thereto. As an example, the compensation capacitor CC may be formed separately from the first connection electrode 158 and/or the anode 171.

The bank layer 165 may be disposed on the second intermediate layer 160, and the bank layer 165 may expose a part of the anode 171. The light-emitting layer 172 of the organic light-emitting diode OLED may be disposed on the exposed anode 171. The light-emitting layer 172 may emit red, green, or blue light. However, the present disclosure is not limited thereto. The cathode 173 of the organic light-emitting diode OLED may be disposed on the light-emitting layer 172 and the bank layer 165. Meanwhile, in FIG. 20, for convenience of description, staking the anode 171, the light-emitting layer 172, and the cathode 173 of the organic light-emitting diode OLED in this order is described as an example. However, the opposite may be adopted.

Meanwhile, in the present disclosure, a configuration is illustrated and described separately for each embodiment to aid in understanding parts related to the embodiments. However, the device may be implemented and driven by combining at least two of these embodiments.

As described above, this embodiment has an effect of compensating for driving current deviation due to a difference in characteristics of a driving transistor after threshold voltage compensation, thereby reducing or minimizing a possibility of occurrence of display defects such as low-gradation unevenness and uniformizing display quality. In addition, this embodiment is applicable to subpixels in which transfer curve characteristics may vary for each subpixel depending on the device characteristics (S-factor) even when the subpixels are driven by compensating for threshold voltages under the same conditions, and has an effect of increasing versatility since a compensation voltage may be applied using various methods.

It will be apparent to those skilled in the art that various modifications and variations can be made in the present disclosure without departing from the spirit or scope of the disclosure. Thus, it is intended that the present disclosure cover the modifications and variations of this disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A display device comprising: a display panel including a subpixel, the subpixel including a compensation circuit and a driving transistor, wherein the compensation circuit is configured to compensate for a driving current generated from the driving transistor based on a compensation voltage input from outside of the sub-pixel, and wherein the compensation circuit comprises: a compensation transistor configured to transmit the compensation voltage; and a compensation capacitor configured to store the compensation voltage output through the compensation transistor, and wherein the compensation capacitor has a first electrode electrically connected to an anode of a light-emitting diode included in the subpixel, and wherein the first electrode of the compensation capacitor overlaps with the anode of the light-emitting diode.

2. The display device according to claim 1, wherein the compensation voltage is selected at a level that varies a gate-source voltage of the driving transistor.

3. The display device according to claim 1, wherein the compensation voltage has a range from a negative voltage to a positive voltage.

4. The display device according to claim 1, wherein the compensation capacitor is disposed adjacent to the anode of the light-emitting diode included in the subpixel.

5. The display device according to claim 1, wherein the compensation capacitor comprises the anode of the light-emitting diode, the first electrode, and an insulating material layer located between the anode and the first electrode.

6. The display device according to claim 5, wherein the compensation transistor is formed based on the same structure as that of the driving transistor, and wherein the display device further comprises a connection electrode configured to connect a drain electrode of the driving transistor and the anode, and the first electrode and the connection electrode are disposed on the same layer.

7. The display device according to claim 4, wherein the compensation transistor has a first electrode electrically connected to a second electrode of the compensation capacitor, a second electrode electrically connected to a compensation voltage line that transmits the compensation voltage, and a gate electrode electrically connected to a scan line.

8. The display device according to claim 5, wherein the compensation voltage line is constituted by a data line electrically connected to the subpixel.

9. The display device according to claim 6, wherein the data line transmits the data voltage for a first time and transmits the compensation voltage for a second time separated from the first time.

10. The display device according to claim 4, wherein the compensation capacitor is connected between the anode of the light-emitting diode included in the subpixel and the compensation transistor.

11. The display device according to claim 1, wherein the compensation voltage is applied after threshold voltage compensation of the driving transistor is completed.

12. The display device according to claim 1, wherein the compensation voltage is applied at one or more different levels for each data line of the display panel or for each data line block of the display panel.

13. The display device according to claim 12, wherein each data line block includes at least three data lines transmitting the compensation voltage applied the same level.

14. The display device according to claim 1, further comprising a data driver configured to supply a data voltage to the subpixel, and to supply the compensation voltage to the subpixel.

15. A method of driving a display device comprising a display panel comprising a plurality of subpixels, the method comprising: compensating for a threshold voltage of a driving transistor included in each of a plurality of subpixels included in the display device; applying a compensation voltage to the plurality of subpixels to compensate for driving current deviation between the plurality of subpixels; and causing the plurality of subpixels to emit light, wherein the compensation voltage is applied to each of the plurality of subpixels by an operation of a compensation circuit, and wherein the compensation circuit comprises: a compensation transistor configured to transmit the compensation voltage; and a compensation capacitor configured to store the compensation voltage output through the compensation transistor, wherein the compensation capacitor has a first electrode electrically connected to an anode of a light-emitting diode included in the subpixel, and wherein the first electrode of the compensation capacitor overlaps with the anode of the light-emitting diode.

16. The method according to claim 15, wherein the compensation voltage has a range from a negative voltage to a positive voltage capable of varying a gate-source voltage of the driving transistor.

17. The method according to claim 11, wherein the compensation voltage is applied to each of the plurality of subpixels by an operation of the compensation circuit comprising the compensation transistor configured to transmit the compensation voltage and the compensation capacitor configured to store the compensation voltage output through the compensation transistor.

18. A display device comprising: a display panel including a subpixel, the subpixel including a compensation circuit and a driving transistor, wherein the compensation circuit is configured to compensate for a driving current generated from the driving transistor based on a compensation voltage input from outside of the sub-pixel, and wherein the compensation circuit comprises: a compensation transistor configured to transmit the compensation voltage; and a compensation capacitor configured to store the compensation voltage output through the compensation transistor, wherein the compensation capacitor has a first electrode electrically connected to an anode of a light-emitting diode included in the subpixel, and wherein the compensation capacitor comprises the anode of the light-emitting diode, the first electrode, and an insulating material layer located between the anode and the first electrode.

19. The display device according to claim 18, wherein the compensation voltage is selected at a level that varies a gate-source voltage of the driving transistor.

20. The display device according to claim 18, wherein the compensation voltage has a range from a negative voltage to a positive voltage.

* * * * *